US012672197B2

(12) United States Patent
Kumar et al.

(10) Patent No.: US 12,672,197 B2
(45) Date of Patent: Jun. 30, 2026

(54) DETECTING UNRESPONSIVE USER EQUIPMENT

(71) Applicant: Dell Products L.P., Round Rock, TX (US)

(72) Inventors: Sunil Kumar, Bangalore (IN); Thiruvenkatam Muthukrishnan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 341 days.

(21) Appl. No.: 18/364,931

(22) Filed: Aug. 3, 2023

(65) Prior Publication Data

US 2025/0048478 A1    Feb. 6, 2025

(51) Int. Cl.
*H04W 76/25*      (2018.01)
*H04W 76/30*      (2018.01)

(52) U.S. Cl.
CPC ........... *H04W 76/25* (2018.02); *H04W 76/30* (2018.02)

(58) Field of Classification Search
CPC ... H04W 76/25; H04W 76/30; H04W 88/085; H04W 76/38
See application file for complete search history.

(56) References Cited

U.S. PATENT DOCUMENTS

| | | | |
|---|---|---|---|
| 10,070,480 B1 | 9/2018 | Narendran et al. | |
| 11,076,439 B2 | 7/2021 | Babaei | |
| 11,184,787 B2 | 11/2021 | Muruganathan et al. | |
| 11,751,163 B2 | 9/2023 | Black | |
| 2005/0249141 A1 | 11/2005 | Lee et al. | |
| 2006/0034205 A1 | 2/2006 | Kim | |
| 2006/0146858 A1 | 7/2006 | Kim | |
| 2014/0169338 A1 | 6/2014 | Bajko | |
| 2016/0037541 A1 | 2/2016 | Kim et al. | |
| 2016/0226629 A1 | 8/2016 | Liu et al. | |
| 2017/0195891 A1 | 7/2017 | Smith et al. | |

(Continued)

FOREIGN PATENT DOCUMENTS

| | | |
|---|---|---|
| CN | 120019600 A | 5/2025 |
| EP | 2844023 | 3/2015 |

(Continued)

OTHER PUBLICATIONS

Notification Concerning Transmittal of International Preliminary Report on Patentability for PCT Application No. PCT/US2023/036315, mailed Feb. 12, 2026, 10 pages.

(Continued)

*Primary Examiner* — Nizam U Ahmed
(74) *Attorney, Agent, or Firm* — Amin, Turocy & Watson, LLP

(57)      ABSTRACT

A system can communicate broadband cellular communications with a base station. The system can receive an indication from the base station to perform iterations of transmitting a keep alive report periodicity signal according to a packet data convergence protocol protocol data unit format. The system can initiate the iterations of transmitting the keep alive report periodicity signal to the base station, wherein, responsive to the initiating, a user equipment release transaction is to be initiated for the system based on a lack of a threshold number of consecutive keep alive report periodicity signals of the keep alive report periodicity signals being received.

20 Claims, 11 Drawing Sheets

(56) References Cited

U.S. PATENT DOCUMENTS

| | | | |
|---|---|---|---|
| 2019/0045580 A1 | 2/2019 | Chai et al. | |
| 2019/0141557 A1 | 5/2019 | da Silva et al. | |
| 2019/0200292 A1 | 6/2019 | Lin et al. | |
| 2019/0342037 A1 | 11/2019 | Karaki et al. | |
| 2021/0044387 A1 | 2/2021 | Vaidya et al. | |
| 2021/0329727 A1* | 10/2021 | Yu | H04W 24/04 |
| 2022/0124579 A1 | 4/2022 | Han et al. | |
| 2022/0149922 A1 | 5/2022 | Wang et al. | |
| 2022/0174458 A1 | 6/2022 | Peng et al. | |
| 2022/0210860 A1 | 6/2022 | Chin et al. | |
| 2022/0303755 A1 | 9/2022 | Karakkad Kesavan Namboodiri et al. | |
| 2022/0337351 A1 | 10/2022 | Lin | |
| 2022/0385409 A1 | 12/2022 | Park et al. | |
| 2023/0084318 A1 | 3/2023 | Ozturk et al. | |
| 2023/0137081 A1 | 5/2023 | Kim et al. | |
| 2023/0138578 A1 | 5/2023 | Azizi et al. | |
| 2023/0189315 A1 | 6/2023 | Haustein et al. | |
| 2023/0199642 A1 | 6/2023 | Loehr et al. | |
| 2023/0217506 A1 | 7/2023 | Lohr et al. | |
| 2023/0379092 A1 | 11/2023 | Chin et al. | |
| 2023/0388204 A1 | 11/2023 | Ramachandra et al. | |
| 2023/0396991 A1 | 12/2023 | Jena et al. | |
| 2024/0276301 A1* | 8/2024 | Zhu | H04L 61/2514 |
| 2024/0292348 A1 | 8/2024 | Luetzenkirchen | |
| 2024/0356828 A1* | 10/2024 | Guo | H04L 67/145 |
| 2025/0047420 A1 | 2/2025 | Kumar et al. | |
| 2025/0247858 A1 | 7/2025 | Talarico et al. | |

FOREIGN PATENT DOCUMENTS

| | | | |
|---|---|---|---|
| EP | 3965313 | | 3/2022 |
| EP | 4274135 A1 | | 11/2023 |
| KR | 20230163422 A | | 11/2023 |
| WO | 2019099383 A1 | | 5/2019 |
| WO | 2022217202 A1 | | 10/2022 |
| WO | 2023/043521 | | 3/2023 |
| WO | 2025021648 A1 | | 1/2025 |

OTHER PUBLICATIONS

"5G; NR; Packet Data Convergence Protocol (PDCP) specification" 3GPP TS 38.323 version 16.2.0 Release 16, 2020, 42 pages.

"5G; NR; Radio Resource Control (RRC); Protocol specification" 3GPP TS 38.331 version 17.0.0 Release 17, 2022, 1197 pages.

"5G; NR; Requirements for support of radio resource management" 3GPP TS 38.133 version 15.3.0 Release 15, 2018, 134 pages.

Kumar et al. "Detecting Unresponsive User Equipment" U.S. Appl. No. 18/364,905, filed Aug. 3, 2023, 47 pages.

Kumar et al. "Detecting Unresponsive User Equipment" U.S. Appl. No. 18/364,913, filed Aug. 3, 2023, 48 pages.

Kumar et al. "Detecting Unresponsive User Equipment" U.S. Appl. No. 18/364,923, filed Aug. 3, 2023, 46 pages.

International Search Report and Written Opinion for PCT Application No. PCT/US2023/036312, mailed Apr. 23, 2024, 17 pages.

"3rd Generation Partnership Project; Technical Specification Group Radio Access Network; NR; Physical layer procedures for data (Release 17)", 3GPP TS 38.214, V17.6.0, Jun. 2023, 231 pages.

International Search Report and Written Opinion for PCT Application No. PCT/US2023/036313, mailed Apr. 16, 2024, 15 pages.

International Search Report and Written Opinion for PCT Application No. PCT/US2023/036314, mailed May 3, 2024, 11 pages.

International Search Report and Written Opinion for PCT Application No. PCT/US2023/036315, mailed Apr. 22, 2024, 15 pages.

Notice of Allowance mailed Sep. 9, 2025 for U.S. Appl. No. 18/364,913, 44 pages.

Office Action mailed Aug. 14, 2025 for U.S. Appl. No. 18/364,905, 48 pages.

Office Action mailed Aug. 7, 2025 for U.S. Appl. No. 18/364,923, 37 pages.

3GPP TS 38.473, Technical Specification Group Radio Access Network, NG-RAN, F1 application protocol (F1AP), Rel-17, V17.0.0, 2022-4 (Year: 2022).

Tweet4technology, https://tweet4technology.blogspot.com/2016/11/measurement-controlrrc-connection.html, LTE 5G-NR Wireless Technology Blog, Nov. 28, 2016 (Year: 2016).

Notice of Allowance mailed Nov. 18, 2025 for U.S. Appl. No. 18/364,923, 31 pages.

Notification Concerning Transmittal of International Preliminary Report on Patentability for PCT Application No. PCT/US2023/036314, mailed Feb. 12, 2026, 6 pages.

Notification Concerning Transmittal of International Preliminary Report on Patentability for PCT Application No. PCT/US2023/036313, mailed Feb. 12, 2026, 10 pages.

Notification Concerning Transmittal of International Preliminary Report on Patentability for PCT Application No. PCT/US2023/036312, mailed Feb. 12, 2026, 10 pages.

Office Action mailed Jan. 21, 2026 for U.S. Appl. No. 18/364,905, 86 pages.

European Office Action mailed Mar. 10, 2026 for European Patent Application No. 23817873.5, 3 pages.

European Office Action mailed Mar. 10, 2026 for European Patent Application No. 23817870.1, 3 pages.

European Office Action mailed Mar. 10, 2026 for European Patent Application No. 23817871.9, 3 pages.

European Office Action mailed Mar. 10, 2026 for European Patent Application No. 23817872.7, 3 pages.

* cited by examiner

100

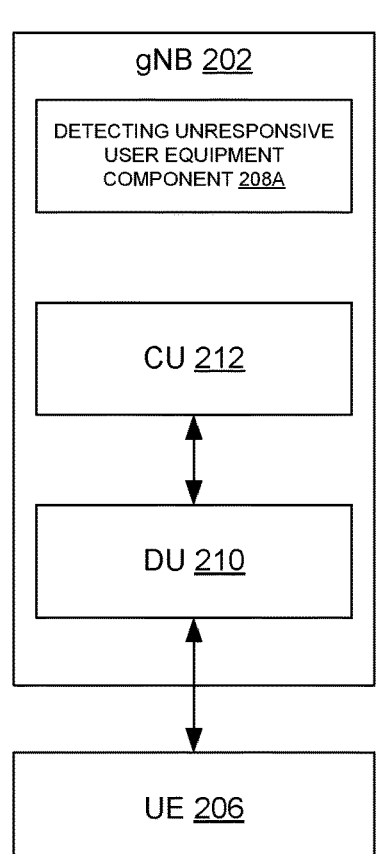
FIG. 2

300
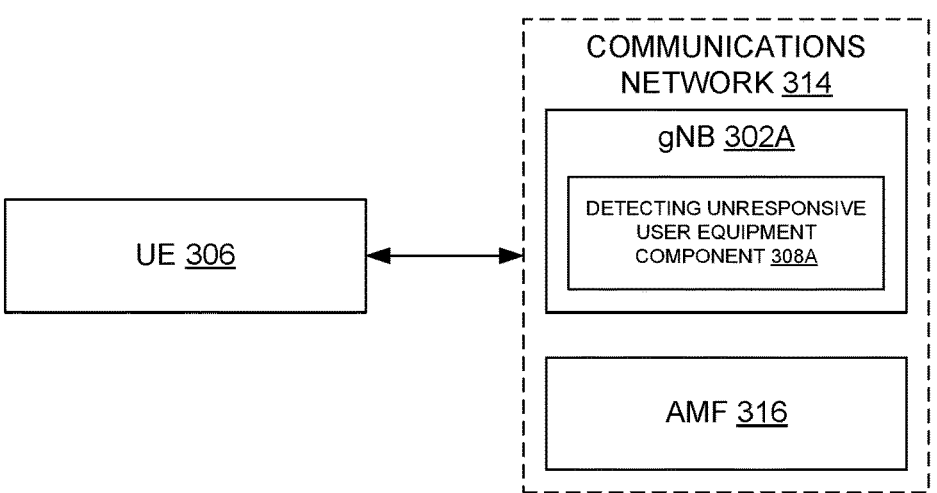
FIG. 3

400
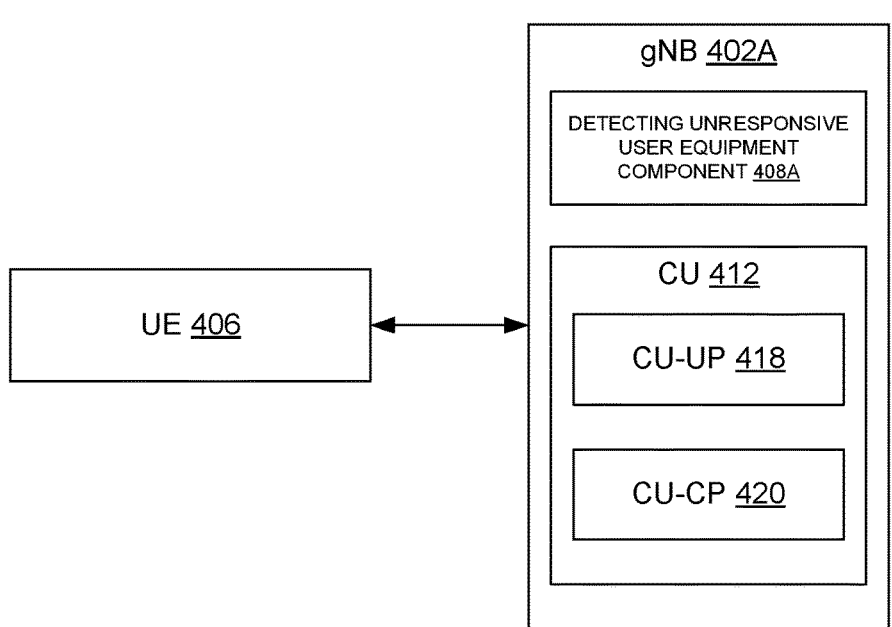
FIG. 4

500

DETECTING UNRESPONSIVE
USER EQUIPMENT
COMPONENT 550A

CONTROL PDU
TYPE 502

| D/C 504 | PDU TYPE 506 | R 508 | R 510 | R 512 | R 514 |
|---|---|---|---|---|---|

CONTROL PDU 522
(WITH KEEP ALIVE
REPORTING)

| PARAMETER 522 | VALUE 524 |
|---|---|
| D/C | 0 |
| PDU TYPE | 011 |
| R (5TH BIT OF OCTET FROM MOST SIGNIFICANT BIT) | 1 |

PDU TYPE 542

| BIT 542 | DESCRIPTION 544 |
|---|---|
| 000 | PDCP STATUS REPORT |
| 001 | INTERSPERSED ROBUST HEADER CORRECTION FEEDBACK |
| 010 | ETHERNET HEADER COMPRESSION FEEDBACK |
| 011 | KEEP ALIVE REPORTING |
| 100-111 | RESERVED |

FIG. 5

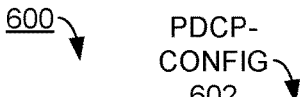

600     PDCP-CONFIG 602

DETECTING UNRESPONSIVE
USER EQUIPMENT
COMPONENT 608

```
-- ASN1START

-- TAG-PDCP-CONFIG-START

PDCP-Config ::=          SEQUENCE {
    drb                      SEQUENCE {
        discardTimer             ENUMERATED {ms10, ms20, ms30, ms40, ms50, ms60, ms75, ms100, ms150,
ms200,
                                 ms250, ms300, ms500, ms750, ms1500, infinity}
OPTIONAL, -- Cond Setup
        KeepAliveReportPeriodicity    ENUMERATED {ms1000, ms2000, ms3000, ms5000,
ms10000, infinity}                      OPTIONAL,   --Cond RLC-UM KeepAliveMissedThreshold    ENUMERATED {n1, n2, n3, n5, infinity}
OPTIONAL,   --Cond RLC-UM
        pdcp-SN-SizeUL           ENUMERATED {len12bits, len18bits}
OPTIONAL, -- Cond Setup2
        pdcp-SN-SizeDL           ENUMERATED {len12bits, len18bits}
OPTIONAL, -- Cond Setup2
        headerCompression        CHOICE {
            notUsed                  NULL,
            rohc                     SEQUENCE {
                maxCID                   INTEGER (1..16383)
DEFAULT 15,
                profiles                 SEQUENCE {
                    profile0x0001            BOOLEAN,
                    profile0x0002            BOOLEAN,
                    profile0x0003            BOOLEAN,
                    profile0x0004            BOOLEAN,
                    profile0x0006            BOOLEAN,
                    profile0x0101            BOOLEAN,
                    profile0x0102            BOOLEAN,
                    profile0x0103            BOOLEAN,
                    profile0x0104            BOOLEAN
                },
                drb-ContinueROHC          ENUMERATED { true }
OPTIONAL     -- Need N
            },
            uplinkOnlyROHC          SEQUENCE {
                maxCID                   INTEGER (1..16383)
DEFAULT 15,
                profiles                 SEQUENCE {
                    profile0x0006            BOOLEAN
                },
                drb-ContinueROHC          ENUMERATED { true }
//etc.
```

FIG. 6

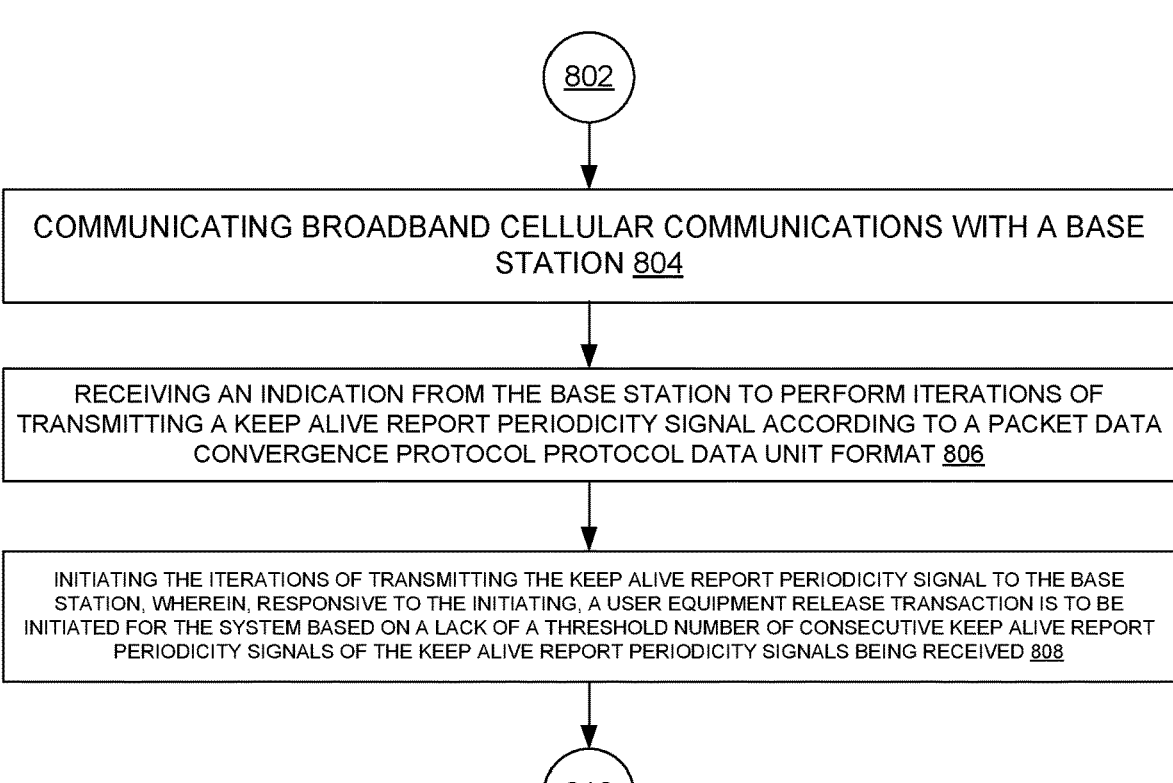
FIG. 8

900

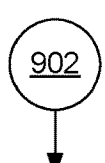

902

FACILITATING BROADBAND CELLULAR COMMUNICATIONS WITH A BASE STATION 904

RECEIVING, FROM THE BASE STATION, AN INSTRUCTION TO PERFORM ITERATIONS OF TRANSMITTING A KEEP ALIVE REPORT PERIODICITY SIGNAL ACCORDING TO A PACKET DATA CONVERGENCE PROTOCOL PROTOCOL DATA UNIT FORMAT, WHEREIN THE KEEP ALIVE REPORT PERIODICITY SIGNAL CORRESPONDS TO THE BROADBAND CELLULAR COMMUNICATIONS 906

INITIATING ITERATIONS OF TRANSMITTING THE KEEP ALIVE REPORT PERIODICITY SIGNAL TO THE BASE STATION, WHEREIN, RESPONSIVE TO THE INITIATING, A USER EQUIPMENT RELEASE TRANSACTION IS TO BE INITIATED FOR THE SYSTEM BASED ON A LACK OF A THRESHOLD NUMBER OF CONSECUTIVE KEEP ALIVE REPORT PERIODICITY SIGNALS OF THE KEEP ALIVE REPORT PERIODICITY SIGNALS BEING RECEIVED 908

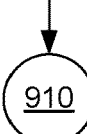

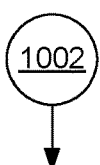

AT LEAST ONE OF SENDING OR RECEIVING BROADBAND CELLULAR COMMUNICATIONS TO OR FROM A BASE STATION, RESPECTIVELY 1004

RECEIVING AN INSTRUCTION FROM THE BASE STATION TO SEND PERIODIC KEEP ALIVE REPORT PERIODICITY SIGNALS TO THE BASE STATION, WHEREIN THE KEEP ALIVE REPORT PERIODICITY SIGNALS CORRESPOND TO THE BROADBAND CELLULAR COMMUNICATIONS 1006

ITERATING A PROCESS OF TRANSMITTING THE KEEP ALIVE REPORT PERIODICITY SIGNAL TO THE BASE STATION, WHEREIN, RESPONSIVE TO THE ITERATING, A USER EQUIPMENT RELEASE TRANSACTION IS CAUSED TO BE INITIATED FOR THE SYSTEM BASED ON A LACK OF A THRESHOLD NUMBER OF CONSECUTIVE KEEP ALIVE REPORT PERIODICITY SIGNALS OF THE KEEP ALIVE REPORT PERIODICITY SIGNALS BEING RECEIVED 1008

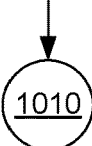

FIG. 10

DETECTING UNRESPONSIVE USER EQUIPMENT

RELATED APPLICATIONS

The subject patent application is related by subject matter to, U.S. patent application Ser. No. 18/364,905, filed Aug. 3, 2023 and entitled "DETECTING UNRESPONSIVE USER EQUIPMENT," the entirety of which application is hereby incorporated by reference herein.

The subject patent application is related by subject matter to, U.S. patent application Ser. No. 18/364,913, filed Aug. 3, 2023 and entitled "DETECTING UNRESPONSIVE USER EQUIPMENT," the entirety of which application is hereby incorporated by reference herein.

The subject patent application is related by subject matter to, U.S. patent application Ser. No. 18/364,923, filed Aug. 3, 2023 and entitled "DETECTING UNRESPONSIVE USER EQUIPMENT," the entirety of which application is hereby incorporated by reference herein.

BACKGROUND

In cellular broadband communications, a core network can determine that a user equipment has become unresponsive.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can communicate broadband cellular communications with a base station. The system can receive an indication from the base station to perform iterations of transmitting a keep alive report periodicity signal according to a packet data convergence protocol protocol data unit format. The system can initiate the iterations of transmitting the keep alive report periodicity signal to the base station, wherein, responsive to the initiating, a user equipment release transaction is to be initiated for the system based on a lack of a threshold number of consecutive keep alive report periodicity signals of the keep alive report periodicity signals being received.

An example method can comprise facilitating, by a system comprising a processor, broadband cellular communications with a base station. The method can further comprise receiving, by the system and from the base station, an instruction to perform iterations of transmitting a keep alive report periodicity signal according to a packet data convergence protocol protocol data unit format, wherein the keep alive report periodicity signal corresponds to the broadband cellular communications. The method can further comprise initiating, by the system, iterations of transmitting the keep alive report periodicity signal to the base station, wherein, responsive to the initiating, a user equipment release transaction is to be initiated for the system based on a lack of a threshold number of consecutive keep alive report periodicity signals of the keep alive report periodicity signals being received.

An example non-transitory computer-readable medium can comprise instructions that, in response to execution, cause a system comprising a processor to perform operations. These operations can comprise at least one of sending or receiving broadband cellular communications to or from a base station, respectively. These operations can further comprise receiving an instruction from the base station to send periodic keep alive report periodicity signals to the base station, wherein the keep alive report periodicity signals correspond to the broadband cellular communications. These operations can further comprise iterating a process of transmitting the keep alive report periodicity signal to the base station, wherein, responsive to the iterating, a user equipment release transaction is caused to be initiated for the system based on a lack of a threshold number of consecutive keep alive report periodicity signals of the keep alive report periodicity signals being received.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates another example system architecture that can facilitate detecting unresponsive user equipment, in accordance with an embodiment of this disclosure;

FIG. 3 illustrates another example system architecture that can facilitate detecting unresponsive user equipment, in accordance with an embodiment of this disclosure;

FIG. 4 illustrates another example system architecture that can facilitate detecting unresponsive user equipment, in accordance with an embodiment of this disclosure;

FIG. 5 illustrates another example system architecture that can facilitate detecting unresponsive user equipment, in accordance with an embodiment of this disclosure;

FIG. 6 illustrates another example system architecture that can facilitate detecting unresponsive user equipment, in accordance with an embodiment of this disclosure;

FIG. 8 illustrates another example process flow that can facilitate detecting unresponsive user equipment, in accordance with an embodiment of this disclosure;

FIG. 9 illustrates another example process flow that can facilitate detecting unresponsive user equipment, in accordance with an embodiment of this disclosure;

FIG. 10 illustrates another example process flow that can facilitate detecting unresponsive user equipment, in accordance with an embodiment of this disclosure;

DETAILED DESCRIPTION

Overview

Figure 1:
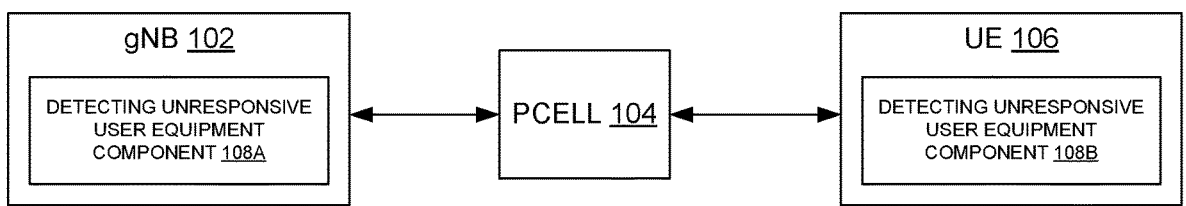
FIG. 1 illustrates an example system architecture that can facilitate detecting unresponsive user equipment, in accordance with an embodiment of this disclosure.

The present techniques can generally relate to a user equipment (UE) using keep alive messages in communications with a gNodeB (gNB) in a course of detecting unresponsive UE.

A gNB can detect whether there is a radio link failure (RLF) in a connection with a UE, and based on that detection, determine that that UE is unresponsive, and stop scheduling data for that UE to conserve resources.

However, where there is no data or uplink (UL) interference, detecting a RLF can be difficult for a gNB. In some examples, it can be that moving a UE to a radio resource control (RRC) inactive state due to data inactivity is not the right approach, as a data inactivity timer can be in seconds. Additionally, it can be that moving a UE to RRC inactive status can be unsuccessful where the UE is unreachable.

Given these problems with prior approaches, the present techniques can be implemented to facilitate using keep alive messaging to detect a reachability of a UE.

A UE can connect to a gNB to get multiple services like enhanced mobile broadband (eMBB) or voice over new radio (VoNR). With eMBB, a data rate between the UE and the gNB will be in gigabits per second (gbps). It can be that efficiently using over-the-air resources can be valuable in achieving and sustaining high data rates. Operators can buy spectrum from a government via auction, and using all resources in the spectrum can be important to providing good quality of service (QOS), and thereby attracting more customers, which can, in turn, result in higher revenue.

There can be problems with prior approaches to detecting that a RLF for a UE. With regard to a transmission control protocol (TCP) and/or a user datagram protocol (UDP), detecting RLF can be difficult for a gNB when there is no data, or when UL interference is high. A TCP retry timeout can take multiple seconds, and this amount of time to detect RLF can be too long.

Another problem with prior approaches can be that a gNB can allocate radio resources and schedule UDP data continuously to a UE even when the UE has stopped responding to the received data at a hybrid automatic repeat request (HARQ) level.

Another problem with prior approaches can be that a gNB can allocate radio resources and schedule UDP data (data centric service) continuously to a UE, even when the UE has stopped responding to the received data at a packed data convergence protocol (PDCP) level (e.g., a level 2 (L2) internal failure at the UE).

In these scenarios, there can be active data flowing in a DL from an application in a gNB, and hence it can be that the UE is not moved to a RRC INACTIVE state. This can waste physical resources and reduce spectrum usage efficiency, where that spectrum could be utilized by other UEs that are functioning normally.

Even with an abnormal UE, early detection and release can mean a faster way to get in service, reduce out-of-service time, and reduce unwanted battery drain during an abnormal period.

In some examples, keep alive reporting can be performed between UE-PDCP and gNB-PDCP to detect whether a UE application is responsive. In contrast to TCP scenarios, it can be that a UDP data session does not have an acknowledgment between peer entities above a L2 module. It can also be that there is not a guarantee that all UDP applications running at a data network/UE have implemented logic to detect and handle such scenarios.

Where there is not an acknowledgment UDP, it could be that a downlink data session continues even when a UE stops working or fails to receive packets due to a failure scenario. In such situations, a gNB can waste its resources by continuously scheduling DL data received from a data network.

The present techniques can be implemented to detect this failure scenario, so that the gNB stops scheduling DL data and conserves resources.

According to the present techniques, a gNB can perform the following to identify a problematic UE at PDCP. The gNB can configure "keep alive report periodicity" when a DRB is established with an RLC-UM mode using RRCReconfiguration signalling messaging towards a UE for transporting application data using UDP (which can be similar to FIG. 6). The gNB can internally maintain a configurable "keep alive missed threshold" value. A UE PDCP can report a keep alive packet in uplink using a PDCP control protocol data unit (PDU; which can be similar to FIG. 7). This PDCP control PDU can have a first reserved bit (e.g., a fifth bit in a first octet of the PDU) and PDU type 011 (which can be a value that indicates keep alive) that, when decoded, can indicate a status of UE (e.g., online or offline) every interval based on the keep alive report periodicity value.

A counter can be maintained to track a keep alive missed threshold. The counter can be set (or reset) to zero when a keep alive packet is received at a gNB PDCP, and the gNB PDCP can drop the keep alive packet. A gNB centralized unit user plane (CU-UP, or CU U-plane) can initiate a bearer context release request to gNB centralized unit control plane (CU-CP, or CU C-plane) on a failure to receive a keep alive packet consecutively for "keep alive missing threshold" times. A gNB CU-CP/RRC can proceed to release the UE and radio resources associated with the UE.

Example Architectures

FIG. 1 illustrates an example system architecture 100 that can facilitate detecting unresponsive user equipment in accordance with an embodiment of this disclosure. In some examples, part(s) of system architecture 100 can be used to implement the example process flows of FIGS. 8-10.

In cellular communications, there can be a master cell group (MCG) to which a UE initially registers. A cell that is used to initiate initial access can be referred to as a primary cell (Pcell).

The examples herein generally relate to fifth generation (5G) cellular communications networks, where Pcells are used. It can be appreciated that the present techniques can be applied to other types of cellular communications networks for detecting unresponsive user equipment.

As depicted, system architecture 100 comprises gNodeB (gNB) 102, Pcell 104. UE 106, detecting unresponsive user equipment component 108A, and detecting unresponsive user equipment component 108B.

gNB 102 can generally comprise a cellular 5G base station, can comprise multiple antennas, and can concurrently communicate with multiple instances of UE 106. UE 106 can generally comprise a computing device that is configured to be used directly by an end-user to communicate with gNB 102. Pcell 104 can be a Pcell as described herein, and that is communicatively coupled to both gNB 102 and UE 106.

Detecting unresponsive user equipment component 108A can generally comprise a component of gNB 102 that facilitates detecting unresponsive user equipment for gNB 102 as described herein. Similarly, detecting unresponsive user equipment component 108B can generally comprise a component of UE 106 that facilitates detecting unresponsive user equipment for UE 106 as described herein.

Figure 7:
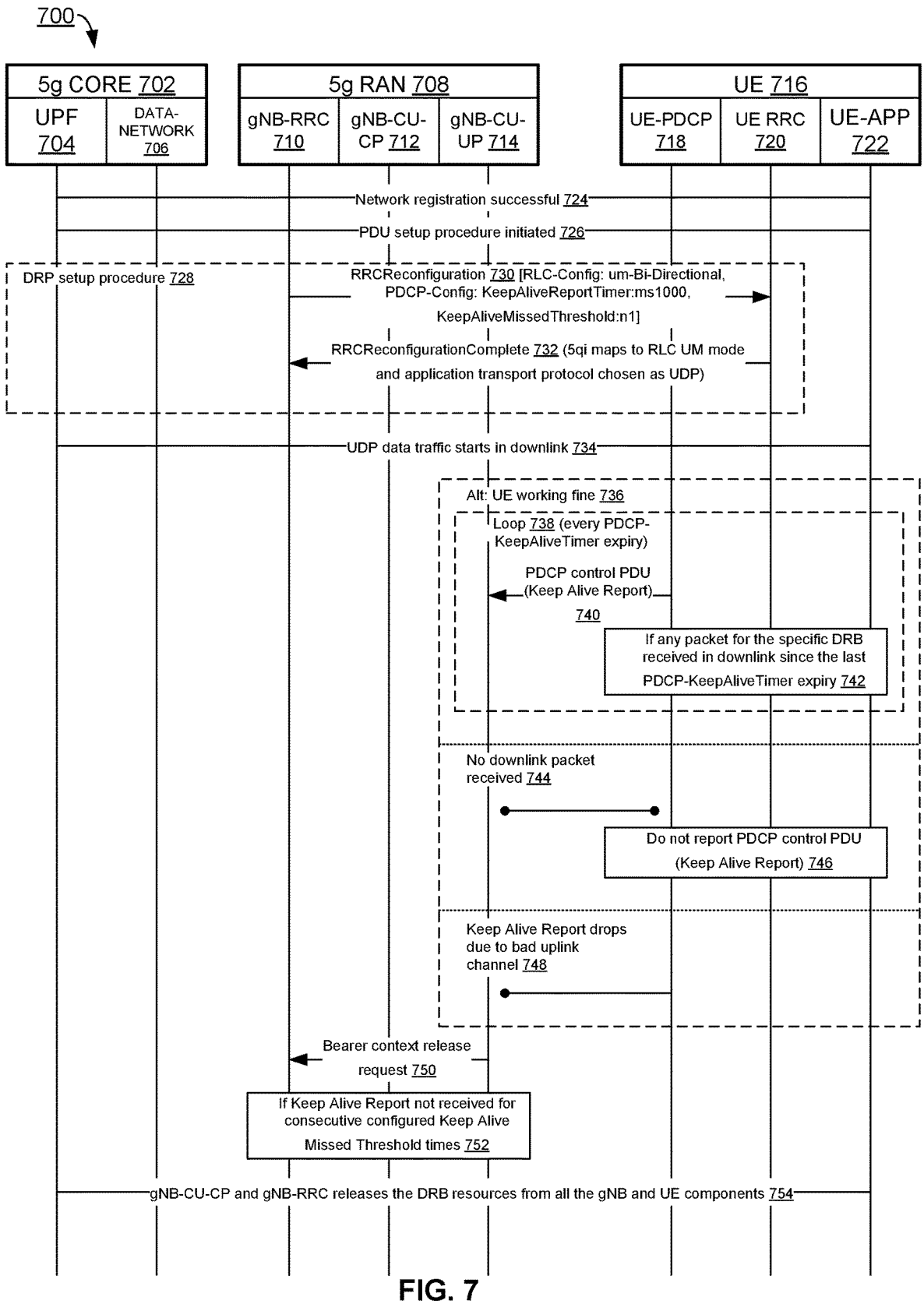
FIG. 7 illustrates an example signal flow that can facilitate detecting unresponsive user equipment, in accordance with an embodiment of this disclosure.

In some examples, detecting unresponsive user equipment component 108A can implement part(s) of the signal flow of FIG. 7, and/or the process flows of FIGS. 8-10 to implement detecting unresponsive user equipment.

It can be appreciated that system architecture 100 (and each of the system architectures of FIGS. 2-3) is one example system architecture for generating and distributing security policies in a containerized environment, and that there can be other system architectures that facilitate generating and distributing security policies in a containerized environment.

FIG. 2 illustrates another example system architecture 200 that can facilitate detecting unresponsive user equipment, in accordance with an embodiment of this disclosure. In some examples, part(s) of system architecture 200 can be implemented by part(s) of system architecture 100 of FIG. 1 to facilitate detecting unresponsive user equipment. In some examples, part(s) of system architecture 200 can be used to implement the example process flows of FIGS. 8-10.

System architecture 200 comprises gNB 202 (which can be similar to gNB 102 of FIG. 1), UE 206 (which can be similar to UE 106), detecting unresponsive user equipment component 208A (which can be similar to detecting unresponsive user equipment component 108A), distributed unit (DU) 210, and centralized unit (CU) 212.

In general, for gNB 202, DU 210 can provide support for lower layers of a protocol stack, such as radio link control (RLC), medium access control (MAC), and physical layer; and CU 212 can provide support for higher layers of the protocol stack, such as service data adaptation protocol (SDAP), packet data convergence protocol (PDCP), and radio resource control (RRC).

UE 206 can communicate with gNB 202 via DU 210, and DU 210 can communicate with CU 212. Given that architecture, it can be that determinations can be made at DU 210 based on information received (or not received) from UE 206 faster than they can be made at CU 212 (since the information from UE 206 would take time to be transferred from DU 210 to CU 212). In some examples, a determination by detecting unresponsive user equipment component 208A that UE 206 is unresponsive can be made at DU 210, which then sends a user equipment context release request to CU 212 to effectuate releasing UE 206.

FIG. 3 illustrates another example system architecture 300 that can facilitate detecting unresponsive user equipment, in accordance with an embodiment of this disclosure. In some examples, part(s) of system architecture 300 can be implemented by part(s) of system architecture 100 of FIG. 1 to facilitate detecting unresponsive user equipment. In some examples, part(s) of system architecture 300 can be used to implement the example process flows of FIGS. 8-10.

System architecture 300 comprises gNB 302 (which can be similar to an instance of gNB 102 of FIG. 1), UE 306 (which can be similar to UE 106), detecting unresponsive user equipment component 308A (which can be similar to detecting unresponsive user equipment component 108A), and access and mobility management component (AMF) 316. Communications network 314 comprises gNB 302 and AMF 316.

AMF 316 can generally comprise a portion of a cellular communications network (along with gNB 302) that is configured to handle connection and mobility management tasks.

A CU of a gNB that determines that UE 306 is unresponsive (here, gNB 302) can send a user equipment context release to AMF 316 that UE 306 is communicatively coupled to as part of the broadband cellular communications.

FIG. 4 illustrates another example system architecture 400 that can facilitate detecting unresponsive user equipment, in accordance with an embodiment of this disclosure.

In some examples, part(s) of system architecture 400 can be implemented by part(s) of system architecture 100 of FIG. 1 to facilitate detecting unresponsive user equipment. In some examples, part(s) of system architecture 400 can be used to implement the example process flows of FIGS. 8-10.

System architecture 400 comprises gNB 402 (which can be similar to an instance of gNB 102 of FIG. 1), UE 406 (which can be similar to UE 106), detecting unresponsive user equipment component 408A (which can be similar to detecting unresponsive user equipment component 108A), CU 412 (which can be similar to CU 212 of FIG. 2), CU-UP 418 and CU-CP 420.

Where a threshold consecutive number of keep alive packet has not been received from UE 406, CU-UP 418 can initiate a bearer context release request to CU-CP 420. CU-CP 420 can then release UE 406 and all radio resources associated with UE 406.

FIG. 5 illustrates another example system architecture 500 that can facilitate detecting unresponsive user equipment, in accordance with an embodiment of this disclosure. In some examples, part(s) of system architecture 500 can be implemented by part(s) of system architecture 100 of FIG. 1 to facilitate detecting unresponsive user equipment. In some examples, part(s) of system architecture 500 can be used to implement the example process flows of FIGS. 8-10.

System architecture comprises 500 control PDU type 502, PDU values table 520, PDU type table 540, and detecting unresponsive user equipment component 550 (which can be similar to detecting unresponsive user equipment component 108A of FIG. 1). In turn, control PDU type 502 comprises D/C 504, PDU type 506, reserved (R) 508, R 510, R 512, and R 514. Control PDU type 502 can be referred to as comprising an octet where it comprises 6 bits.

PDU values table 520 comprises parameter 522 and proposed value 524. PDU type table comprises bit 542 and description 544.

Control PDU type 502 can be used in communications between gNB 102 of FIG. 1 and UE 106 in performing keep alive reporting as part of detecting unresponsive user equipment.

FIG. 6 illustrates another example system architecture 600 that can facilitate detecting unresponsive user equipment, in accordance with an embodiment of this disclosure. In some examples, part(s) of system architecture 600 can be implemented by part(s) of system architecture 100 of FIG. 1 to facilitate detecting unresponsive user equipment. In some examples, part(s) of system architecture 600 can be used to implement the example process flows of FIGS. 8-10.

System architecture 600 comprises PDCP-Config 602 and detecting unresponsive user equipment component 608 (which can be similar to detecting unresponsive user equipment component 108A of FIG. 1). PDCP-Config 602 can comprise a PDCP configuration file, that can be used by a gNB and UE (e.g., gNB 102 of FIG. 1, and UE 106) to facilitate detecting unresponsive user equipment using keep alive reporting. Portions of PDCP-Config 602 have been truncated for space considerations, and it can be appreciated that other PDCP configuration parameters can be configured in PDCP-Config 602.

PDCP-Config 602 comprises KeepAliveReportPeriodicity and KeepAliveMissedThreshold. KeepAliveReportPeriodicity can generally indicate a time value, such as expressed in milliseconds (ms). Value ms1000 corresponds to 1000 ms, value ms2000 corresponds to 2000 ms, etc. In cases where this value is configured as infinity (e.g., not configured with a value), it can be that this value is not reported. On expiry, a UE PDCP can trigger a PDCP control PDU (keep alive report) if a Downlink packet was received since the last keep alive reporting.

KeepAliveMissedThreshold can generally indicate a value as an integer. This value can represent a number of missed keep alive reports that will cause a network to release the UE.

Example Signal Flow

FIG. 7 illustrates an example signal flow 700 that can facilitate detecting unresponsive user equipment, in accordance with an embodiment of this disclosure. In some examples, part(s) of signal flow 700 can be implemented by part(s) of system architecture 100 of FIG. 1 to facilitate detecting unresponsive user equipment.

As depicted, in signal flow 700, communications are sent between 5 g core 702 (which comprises user plane function (UPF) 704 and data-network 706); 5 g radio access network (RAN) 708 (which comprises gNB-RRC 710, gNB-CU-CP 712, and gNB CU-UP 714); and UE 716 (which comprises UE-PDCP 718, UE-RRC 720, and UE-app 722).

The signal flow of signal flow 700 is an example signal flow, and there can be signal flows that implement different signals, or the signals of signal flow 700 in a different order, as part of facilitating detecting unresponsive user equipment.

As depicted in signal flow 700, the following occurs:

Network registration successful 724

PDU setup procedure initiated 726

Dynamic radio resource provisioning (DRP) setup procedure 728

RRCReconfiguration 730 [RLC-Config: um-Bi-Directional, PDCP-Config: KeepAliveReportTimer: ms1000, KeepAliveMissedThreshold: n1]

RRCReconfigurationComplete 732 (quality-of-service indicator (5qi) maps to RLC un-acknowledge mode (UM) and application transport protocol chosen as UDP)

UDP data traffic starts in downlink 734

Alt: UE working fine 736

Loop 738 (every PDCP-KeepAliveTimer expiry)

PDCP control PDU (Keep Alive Report 740).

If any packet for the specific DRB received in downlink since the last PDCP-KeepAliveTimer expiry 742

No downlink packet received 744

Do not report PDCP control PDU (Keep Alive Report) 746

Keep Alive Report drops due to bad uplink channel 748

Bearer context release request 750

If Keep Alive Report not received for consecutive configured Keep Alive Missed Threshold times 752 gNB-CU-CP and gNB-RRC releases the DRB resources from all the gNB and UE components 754

Example Process Flows

FIG. 8 illustrates an example process flow 800 that can facilitate detecting unresponsive user equipment, in accordance with an embodiment of this disclosure. In some examples, one or more embodiments of process flow 800 can be implemented by detecting unresponsive user equipment component 108B of gNB 102 FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 900 of FIG. 9, and/or process flow 1000 of FIG. 10.

Process flow 800 begins with 802, and moves to operation 804.

Operation 804 depicts communicating broadband cellular communications with a base station. Using the example of FIG. 1, this can comprise UE 102 having set up a connection with gNB 106.

After operation 804, process flow 800 moves to operation 806.

Operation 806 depicts receiving an indication from the base station to perform iterations of transmitting a keep alive report periodicity signal according to a packet data convergence protocol protocol data unit format. This receiving can comprise a UE receiving, from a gNB, PDCP configuration information similar to PDCP-Config 602 of FIG. 6, where the user equipment can transmit a PDU that has a format that is similar to the format of system architecture 500 of FIG. 5. The keep alive report periodicity signal can be sent by a UE, and can be similar to PDCP control PDU (keep alive report) 740 of FIG. 7 (where iterations of it are performed as part of loop 738), and where the signal is sent between UE 716 and 5 g RAN 708.

In some examples, initiating the iterations comprises initiating the iterations of transmitting the keep alive report periodicity signal to the base station based on establishing a data radio bearer with a radio link control unacknowledged mode. In some examples, the data radio bearer is established using a radio resource control reconfiguration control signalling message that is received from the base station and that indicates transporting application data using a user datagram protocol. That is, keep alive report periodicity can be configured when a DRB is established with an RLC-UM mode using RRCReconfiguration signalling message towards a UE for transporting application data using UDP.

After operation 806, process flow 800 moves to operation 808.

Operation 808 depicts, initiating the iterations of transmitting the keep alive report periodicity signal to the base station, wherein, responsive to the initiating, a user equipment release transaction is to be initiated for the system based on a lack of a threshold number of consecutive keep alive report periodicity signals of the keep alive report periodicity signals being received. That is, signals such as signals 736-948 of FIG. 7 can be initiated. Where keep alive report periodicity signals are not successfully sent by the UE to the gNB (e.g., no downlink packet received 744 and/or keep alive report drops due to bad uplink channel 748), this can cause a user equipment release transaction to be initiated for the UE.

In some examples, responsive to the initiating, the user equipment release transaction is to be initiated for the system from a distributed unit of the base station.

In some examples, the system is communicatively coupled to an access and mobility management function component as part of the broadband cellular communications, and, responsive to the initiating, a user equipment context release is to be initiated with the access and mobility management function component. That is, where the communications network comprises an AMF, and based on a lack of keep alive messages that the UE sends to the gNB, a CU can trigger a release of the UE to the AMF of the communications network.

In some examples, operation 808 comprises sending a status of the system based on a first keep alive report periodicity signal of the iterations of transmitting the keep alive report periodicity signal, and a reserved bit of the first keep alive report periodicity signal indicates whether the system is online or offline.

In some examples, respective protocol data unit types of respective keep alive report periodicity signals of the iterations of transmitting the keep alive report periodicity signal indicate that the respective keep alive report periodicity signals are keep alive report periodicity signals.

After operation 808, process flow 800 moves to 810, where process flow 800 ends.

FIG. 9 illustrates an example process flow 900 that can facilitate detecting unresponsive user equipment, in accordance with an embodiment of this disclosure. In some examples, one or more embodiments of process flow 900 can be implemented by detecting unresponsive user equipment component 108B of gNB 102 FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 800 of FIG. 8 and/or process flow 1000 of FIG. 10.

Process flow 900 begins with 902, and moves to operation 904.

Operation 904 depicts facilitating broadband cellular communications with a base station. In some examples, operation 904 can be implemented in a similar manner as operation 804 of FIG. 8.

After operation 904, process flow 900 moves to operation 906.

Operation 906 depicts receiving, from the base station, an instruction to perform iterations of transmitting a keep alive report periodicity signal according to a packet data convergence protocol protocol data unit format, wherein the keep alive report periodicity signal corresponds to the broadband cellular communications. In some examples, operation 906 can be implemented in a similar manner as operation 806 of FIG. 8.

After operation 906, process flow 900 moves to operation 908.

Operation 908 depicts initiating iterations of transmitting the keep alive report periodicity signal to the base station, wherein, responsive to the initiating, a user equipment release transaction is to be initiated for the system based on a lack of a threshold number of consecutive keep alive report periodicity signals of the keep alive report periodicity signals being received. In some examples, operation 908 can be implemented in a similar manner as operation 808 of FIG. 8.

In some examples, operation 908 comprises In some examples, the threshold number of consecutive keep alive report periodicity signals is configurable. In some examples, the threshold number of consecutive keep alive report periodicity signals is configurable based on user configuration data that is associated with a user account. That is, there can be a threshold number of consecutive keep alive report periodicity signals that can fail to be successfully transmitted from a UE to a gNB before the UE is considered to be unresponsive. That is, UE PDCP can report a "keep alive" packet (that can be similar to part(s) of FIG. 7) in uplink using PDCP Control PDU with a first reserved bit (e.g., a fifth bit in a first octet) and PDU type 011 (which can comprise a value for keep alive) which, when decoded, can indicate the status of a UE (e.g., online or offline) every interval based on a keep alive report periodicity.

In some examples, responsive to the initiating, a counter is to be reset based on a keep alive report periodicity signal of the keep alive report periodicity signals being received. In some examples, the keep alive report periodicity signal is to be dropped at a packet data convergence protocol stack of the base station. That is, a counter to keep track of a keep alive missed threshold can be set to zero when UE successfully sends a keep alive packet to a gNB PDCP, and the keep alive packet can be dropped at the gNB PDCP.

After operation 908, process flow 900 moves to 910, where process flow 900 ends.

FIG. 10 illustrates an example process flow 1000 that can facilitate detecting unresponsive user equipment, in accordance with an embodiment of this disclosure. In some examples, one or more embodiments of process flow 1000 can be implemented by detecting unresponsive user equipment component 108B of gNB 102 FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 800 of FIG. 8 and/or process flow 900 of FIG. 9.

Process flow 1000 begins with 1002, and moves to operation 1004.

Operation 1004 depicts at least one of sending or receiving broadband cellular communications to or from a base station, respectively. In some examples, operation 1004 can be implemented in a similar manner as operation 704 of FIG. 7.

After operation 1004, process flow 1000 moves to operation 1006.

Operation 1006 depicts receiving an instruction from the base station to send periodic keep alive report periodicity signals to the base station, wherein the keep alive report periodicity signals correspond to the broadband cellular communications. In some examples, operation 1006 can be implemented in a similar manner as operation 806 of FIG. 8.

After operation 1006, process flow 1000 moves to operation 1008.

Operation 1008 depicts iterating a process of transmitting the keep alive report periodicity signal to the base station, wherein, responsive to the iterating, a user equipment release transaction is caused to be initiated for the system based on a lack of a threshold number of consecutive keep alive report periodicity signals of the keep alive report periodicity signals being received. In some examples, operation 1008 can be implemented in a similar manner as operation 808 of FIG. 8.

In some examples, In some examples, operation 1008 comprises, responsive to the iterating, a bearer context release request is caused to be sent from a first node of the system that terminates in a U-plane of the base station to a second node of the base station that terminates in a C-plane of the base station. That is, based on the UE not successfully sending a consecutive number of keep alive packets to the gNB, a gNB CU-UP can initiate a bearer context release request to a gNB CU-CP on failure to receive keep alive packets consecutively for keep alive missing threshold times.

In some examples, operation 1008 comprises, responsive to the iterating, a release of the system is caused to occur by a radio resource control of a node of the base station that terminates in a C-plane of the base station. In some examples, operation 1008 comprises, responsive to the iterating, a release of radio resources associated with the system is caused to occur by a radio resource control of a node of the base station that terminates in a C-plane of the base station. That is, based on the UE not successfully sending a consecutive number of keep alive packets to the gNB, a gNB CU-CP/RRC can proceed to release the UE and radio resources associated with UE.

In some examples, In some examples, the user equipment release transaction indicates a reason for releasing the system, and wherein the reason indicates a radio network layer or a radio link failure. That is, a UE context release request can be sent to a CU, with a cause (e.g., radio_network_layer or RL failure).

After operation 1008, process flow 1000 moves to 1010, where process flow 800 ends.

Example Operating Environment

Figure 11:
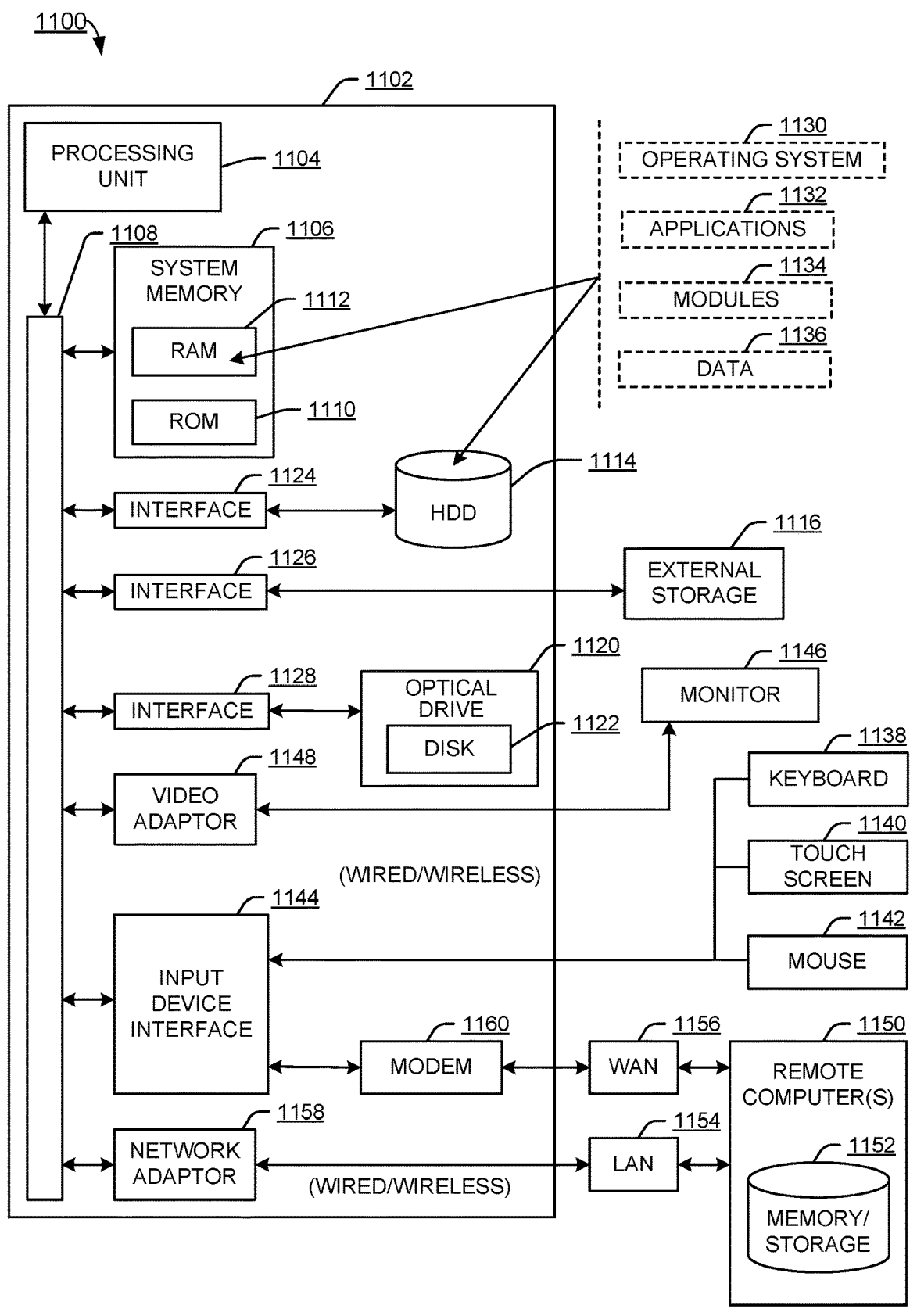
FIG. 11 illustrates an example block diagram of a computer operable to execute an embodiment of this disclosure.

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of gNB 102, Pcell 104, and/or UE 106, of FIG. 1.

In some examples, computing environment 1100 can implement one or more embodiments of the signal flow of FIG. 7, and/or the process flows of FIGS. 8-10 to facilitate detecting unresponsive user equipment.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 (containing disk 1122) can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database." "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory that stores executable instructions that, when executed by the at least one processor, facilitate performance of operations, comprising:
communicating broadband cellular communications with a base station;
receiving an indication from the base station to perform iterations of transmitting a keep alive report periodicity signal according to a packet data convergence protocol protocol data unit format; and
initiating the iterations of transmitting the keep alive report periodicity signal to the base station, wherein, responsive to the initiating, a user equipment release transaction is to be initiated for the system based on a lack of a threshold number of consecutive keep alive report periodicity signals of the keep alive report periodicity signals being received, wherein responsive to the iterations, a bearer context release request is caused to be sent from a first node of the base station that terminates in a U-plane of the base station to a second node of the base station that terminates in a C-plane of the base station.

2. The system of claim 1, wherein, responsive to the initiating, the user equipment release transaction is to be initiated for the system from a distributed unit of the base station.

3. The system of claim 1, wherein the operations further comprise:
sending a status of the system based on a first keep alive report periodicity signal of the iterations of transmitting the keep alive report periodicity signal, wherein a reserved bit of the first keep alive report periodicity signal indicates whether the system is online or offline.

4. The system of claim 1, wherein the system is communicatively coupled to an access and mobility management function component as part of the broadband cellular communications, and wherein, responsive to the initiating, a user equipment context release is to be initiated with the access and mobility management function component.

5. The system of claim 1, wherein respective protocol data unit types of respective keep alive report periodicity signals of the iterations of transmitting the keep alive report periodicity signal indicate that the respective keep alive report periodicity signals are keep alive report periodicity signals.

6. The system of claim 1, wherein initiating the iterations comprises:
initiating the iterations of transmitting the keep alive report periodicity signal to the base station based on establishing a data radio bearer with a radio link control unacknowledged mode.

7. The system of claim 6, wherein the data radio bearer is established using a radio resource control reconfiguration control signalling message that is received from the base station and that indicates transporting application data using a user datagram protocol.

8. A method, comprising:
facilitating, by a system comprising at least one processor, broadband cellular communications with a base station;
receiving, by the system and from the base station, an instruction to perform iterations of transmitting a keep alive report periodicity signal according to a packet data convergence protocol protocol data unit format, wherein the keep alive report periodicity signal corresponds to the broadband cellular communications; and
initiating, by the system, iterations of transmitting the keep alive report periodicity signal to the base station, wherein, responsive to the initiating, a user equipment release transaction is to be initiated for the system based on a lack of a threshold number of consecutive keep alive report periodicity signals of the keep alive report periodicity signals being received, wherein responsive to the iterations, a bearer context release request is caused to be sent from a first node of the base station that terminates in a U-plane of the base station to a second node of the base station that terminates in a C-plane of the base station.

9. The method of claim 8, wherein the threshold number of consecutive keep alive report periodicity signals is configurable.

10. The method of claim 9, wherein the threshold number of consecutive keep alive report periodicity signals is configurable based on user configuration data that is associated with a user account.

11. The method of claim 8, further comprising:
sending, by the system, a status of the system based on a first keep alive report periodicity signal of the iterations of the keep alive report periodicity signal, wherein a reserved bit of the first keep alive report periodicity signal indicates whether the system is online or offline.

12. The method of claim 11, wherein respective keep alive report periodicity signals of the iterations of the keep alive report periodicity signal comprise a protocol data unit.

13. The method of claim 11, wherein respective protocol data unit types of respective keep alive report periodicity signals of the iterations of the keep alive report periodicity signal indicate that the respective keep alive report periodicity signals are keep alive report periodicity signals.

14. The method of claim 8, wherein, responsive to the initiating, a counter is to be reset based on a keep alive report periodicity signal of the keep alive report periodicity signals being received.

15. The method of claim 14, wherein the keep alive report periodicity signal is to be dropped at a packet data convergence protocol stack of the base station.

16. A non-transitory computer-readable medium comprising instructions that, in response to execution, cause a system comprising at least one processor to facilitate performance of operations, comprising:

at least one of sending or receiving broadband cellular communications to or from a base station, respectively;

receiving an instruction from the base station to send periodic keep alive report periodicity signals to the base station, wherein the keep alive report periodicity signals correspond to the broadband cellular communications; and iterating a process of transmitting the keep alive report periodicity signal to the base station, wherein, responsive to the iterating, a user equipment release transaction is caused to be initiated for the system based on a lack of a threshold number of consecutive keep alive report periodicity signals of the keep alive report periodicity signals being received, wherein responsive to the iterating, a bearer context release request is caused to be sent from a first node of the base station that terminates in a U-plane of the base station to a second node of the base station that terminates in a C-plane of the base station.

17. The non-transitory computer-readable medium of claim 16, wherein, responsive to the iterating, a release of the system is caused to occur by a radio resource control of the second node.

18. The non-transitory computer-readable medium of claim 16, wherein, responsive to the iterating, a release of radio resources associated with the system is caused to occur by a radio resource control of the second node.

19. The non-transitory computer-readable medium of claim 16, wherein the user equipment release transaction indicates a reason for releasing the system, and wherein the reason indicates a radio network layer or a radio link failure.

20. The non-transitory computer-readable medium of claim 16, wherein, responsive to the initiating, the user equipment release transaction is to be initiated for the system from a distributed unit of the base station.

* * * * *